US010397203B2

(12) United States Patent
Kohiyama

(10) Patent No.: US 10,397,203 B2
(45) Date of Patent: Aug. 27, 2019

(54) RECEPTION DEVICE AND RECEPTION METHOD

(71) Applicant: FUJITSU LIMITED, Kawasaki-shi, Kanagawa (JP)

(72) Inventor: Kiyoshi Kohiyama, Toshima (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 15/235,881

(22) Filed: Aug. 12, 2016

(65) Prior Publication Data

US 2016/0352711 A1 Dec. 1, 2016

Related U.S. Application Data

(63) Continuation of application No. PCT/JP2014/053672, filed on Feb. 17, 2014.

(51) Int. Cl.
*G06F 21/10* (2013.01)
*H04L 29/06* (2006.01)
(Continued)

(52) U.S. Cl.
CPC ........ *H04L 63/061* (2013.01); *G06F 12/1408* (2013.01); *G06F 21/10* (2013.01);
(Continued)

(58) Field of Classification Search
CPC .............. H04L 63/061; H04N 21/2347; H04N 21/26606; H04N 21/4623; H04H 60/23; H04H 60/25
See application file for complete search history.

(56) References Cited

U.S. PATENT DOCUMENTS 6,105,134 A * 8/2000 Pinder ..................... H04L 63/04 348/E5.004
8,359,626 B1 * 1/2013 Rey ...................... H04N 21/235 725/132

(Continued)

FOREIGN PATENT DOCUMENTS

EP 2 570 918 A1 3/2013
JP 2005-149260 6/2005

(Continued)

OTHER PUBLICATIONS

Japanese Office Action dated Sep. 19, 2017 in corresponding Japanese Patent Application No. 2015-562683.

(Continued)

*Primary Examiner* — Ellen Tran
(74) *Attorney, Agent, or Firm* — Staas & Halsey LLP

(57) ABSTRACT

A reception device includes: a receiver unit which receives a program that is encrypted, handles confidential information and includes identification information for identifying a target of use of the program, and a notification signal for notifying of delivery of the program and including delivery destination information for identifying a delivery destination of the program; a processor which determines whether the reception device is a delivery target of the program on the basis of the delivery destination information included in the notification signal, and prepares for receiving the program when the reception device is the delivery target of the program; and an information protection unit which determines whether the reception device is the target of use of the program with reference to the identification information included in the program, and decrypts the program when the reception device is the target of use of the program.

8 Claims, 6 Drawing Sheets

START
S101 IS INFORMATION PROTECTION UNIT OF DEVICE ITSELF DELIVERY TARGET IDENTIFIED BY CAS BASE ID CONTAINED IN NOTIFICATION SIGNAL? (Yes / No)
S102 WHEN VERSION NUMBER OF CAS PROGRAM IS CONTAINED IN NOTIFICATION SIGNAL IS VERSION NUMBER LARGER THAN OR EQUAL TO REGISTERED VERSION NUMBER? (Yes / No)
S103 PREPARE FOR RECEIVING CAS PROGRAM
S104 EXTRACT ENCRYPTED ENCRYPTION KEY FROM PACKET AND DECRYPT ENCRYPTION KEY
S105 CAN VALIDITY OF RECEIVED CAS PROGRAM BE PROVED? (Yes / No)
S106 DO MAKER ID AND PLATFORM ID MATCH CORRESPONDING IDS? (Yes / No)
S107 IS UPDATE OF CAS PROGRAM NEEDED? (Yes / No)
S108 UPDATE PROGRAM MODULE HAVING AT LEAST ONE OF MAJOR VERSION NUMBER AND MINOR VERSION NUMBER CONTAINED IN ADDITIONAL INFORMATION LARGER THAN CORRESPONDING VERSION NUMBER REGISTERED IN ADVANCE
S109 REGISTER UPDATED PROGRAM MODULES AND VERSION NUMBERS
END

(51) Int. Cl.
*G06F 12/14* (2006.01)
*G06F 21/57* (2013.01)

(52) U.S. Cl.
CPC ........ *G06F 21/572* (2013.01); *H04L 63/0457* (2013.01); *G06F 2212/1052* (2013.01)

(56) References Cited

U.S. PATENT DOCUMENTS

2006/0101485 A1 5/2006 Nishimoto
2007/0265966 A1 11/2007 Kahn et al.
2011/0010545 A1* 1/2011 Kill ........................ G06F 21/10 713/168
2011/0145876 A1* 6/2011 Choi ................. H04N 7/17318 725/110
2011/0213976 A1* 9/2011 Ryou .................... H04N 7/165 713/169
2011/0247032 A1* 10/2011 Koo ................ H04N 21/23617 725/27
2014/0006951 A1 1/2014 Hunter

FOREIGN PATENT DOCUMENTS

JP 2006-140624 6/2006
JP 2007-201911 8/2007
JP 2009-267605 11/2009
JP 2012-23547 2/2012
WO 2010/102259 A2 9/2010

OTHER PUBLICATIONS

Kawakita et al., "A Downloadable Conditional Access System for Broadcasting", Technical Report of the Institute of Image Information and Television Engineers, ITE Technical Report vol. 36, No. 6, Feb. 2012, pp. 59-62.
"Operational Guidelines for Digital Satellite Sound Broadcasting", ARIB TR-B26 1.2, Association of Radio Industries and Businesses, Sep. 2007, 247 pp.
"Receiver for Digital Broadcasting"(Desirable Specifications) ARIB STD-B21 5.0, Association of Radio Industries and Businesses, Jul. 2010, 391 pp.
International Search Report dated Jun. 3, 2014 in corresponding International Application No. PCT/JP2014/053672, 4 pp. (with translation).
Extended European Search Report dated Jan. 12, 2017 in corresponding European Patent Application No. 14882407.1.
Office Action dated Apr. 1, 2019 in corresponding European Patent Application No. 14882407.1 (6 pages).
Office Action dated Jan. 30, 2018 in corresponding Japanese Patent Application No. 2015-562683, 5 pp.

* cited by examiner

BROADCAST STATION
NOTIFICATION SIGNAL
CAS PROGRAM
ENCRYPTION
ENCRYPTION
ENCRYPTION
Kt
Kdl
Kb
100
DCM
DMM
RECEPTION DEVICE
MAIN PROCESSOR
(DELIVERY TARGET
DETERMINATION,
RECEPTION PREPARATION)
INFORMATION PROTECTION UNIT
DECRYPTION
DECRYPTION
DECRYPTION
Kb
8
9
1

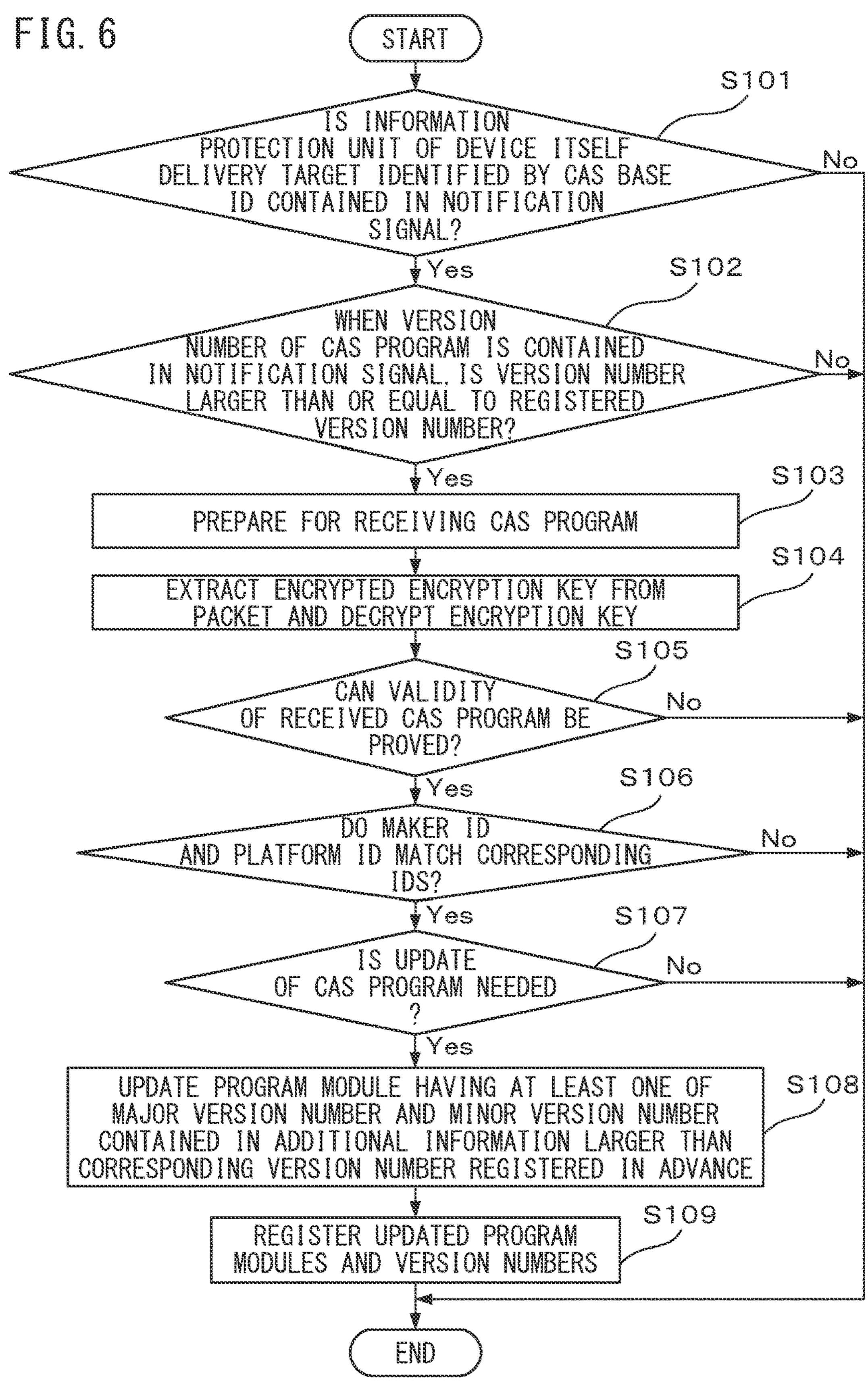
FIG. 6
START
S101
IS INFORMATION PROTECTION UNIT OF DEVICE ITSELF DELIVERY TARGET IDENTIFIED BY CAS BASE ID CONTAINED IN NOTIFICATION SIGNAL?
No
Yes
S102
WHEN VERSION NUMBER OF CAS PROGRAM IS CONTAINED IN NOTIFICATION SIGNAL, IS VERSION NUMBER LARGER THAN OR EQUAL TO REGISTERED VERSION NUMBER?
No
Yes
S103
PREPARE FOR RECEIVING CAS PROGRAM
S104
EXTRACT ENCRYPTED ENCRYPTION KEY FROM PACKET AND DECRYPT ENCRYPTION KEY
S105
CAN VALIDITY OF RECEIVED CAS PROGRAM BE PROVED?
No
Yes
S106
DO MAKER ID AND PLATFORM ID MATCH CORRESPONDING IDS?
No
Yes
S107
IS UPDATE OF CAS PROGRAM NEEDED ?
No
Yes
S108
UPDATE PROGRAM MODULE HAVING AT LEAST ONE OF MAJOR VERSION NUMBER AND MINOR VERSION NUMBER CONTAINED IN ADDITIONAL INFORMATION LARGER THAN CORRESPONDING VERSION NUMBER REGISTERED IN ADVANCE
S109
REGISTER UPDATED PROGRAM MODULES AND VERSION NUMBERS
END

RECEPTION DEVICE AND RECEPTION METHOD

CROSS-REFERENCE TO RELATED APPLICATION

This application is a continuation application of International Application PCT/JP2014/053672, filed on Feb. 17, 2014, and designated the U.S., the entire contents of which are incorporated herein by reference.

FIELD

The present invention relates to, for example, a reception device which receives a program handling confidential information and a reception method of such a program.

BACKGROUND

In recent years, services which encrypt and transmit information such as a video signal have been provided as digital television broadcasting. In order to prevent the transmitted information from illegal use, a reception device used in such services decrypts encrypted information using a highly secure device including a processor and a memory which are not easily accessible from outside. Such a scheme handling encrypted video signal is referred to as a conditional access system (CAS) or a digital rights management (DRM). The CAS is implemented by a card-type system, i.e., a security card, for example.

For example, in the digital television broadcasting, a compressed video stream is encrypted with a scramble key Ks, and the scramble key Ks which is updated every several seconds to be used for decryption of the video stream is included in the broadcasting video stream. The scramble key Ks is encrypted with a work key Kw, and is generally inserted in a digital signal packet referred to as an entitlement control message (ECM). In addition, the work key Kw is encrypted with a master key Km which is known only by a broadcasting station for each individual viewer and the viewer, and is generally inserted in a digital signal packet referred to as an Entitlement Management Message (EMM). The ECM and EMM are multiplexed, for example, into a digital stream by time division multiplexing to be transmitted. The master key Km is stored in a memory embedded in a security card provided in a reception device, and it is difficult to access the master key Km from outside of the security card. A portion of program (channel) information (the above-mentioned stream) selected by a tuner is input to a security card under the control of a program running on a main processor incorporated in the system LSI. Then, the decrypted scramble key Ks is output from the security card. The decrypted scramble key Ks is received by a main processor and is input, for example, to an encryption circuit. The compressed video stream encrypted with the scramble key Ks is input to the encryption circuit together with the scramble key, and the encryption circuit decrypts the compressed video stream for output. The compressed video stream thus decrypted is input to a video processing circuit where the compressed video stream is expanded and converted into YPbPr or RGB video signals. The video signal is input into a graphics circuit. The graphics circuit inserts additional information such as a program title into the video signals, and the resulting video is output to a monitor. The monitor displays the obtained video.

An information transmission scheme using three types of encryption keys, the master key Km, the work key Kw, and the scramble key Ks as described above is referred to as a triple key scheme. The master key Km is a unique key, i.e., only one key assigned to each individual viewer. In other words, the work key Kw encrypted with the master key Km which is held only by each individual viewer is transmitted, and this enables each individual viewer to access the transmitted information. How the work key Kw is used is not limited, but the key is normally used to assign a viewing right to a specific channel. For example, in order to assign a viewing right of a pay broadcast channel to a contract viewer, the work key Kw encrypted with the master key Km unique to the viewer is transmitted. The scramble key Ks is used, for example, to encrypt the video signal of a specific channel. For example, when the viewer views the pay broadcast channel, a reception device decrypts a video signal of the channel by decrypting the scramble key Ks encrypted with the work key Kw corresponding to the channel.

In a case in which a program executed on a main processor controls processing for the above-described security card, the master key Km or the work key Kw may be stolen when the program is hacked. For example, when the program is altered (rewritten) without permission and the master key Km or the work key Kw stored in the security card is copied without permission, there is a possibility, in the worst case, that the master key Km or the work key Kw may be disclosed to the public on the Internet. In such a case, everyone can view the pay broadcast without permission.

It is preferable that the master key Km and the work key Kw are not disclosed to a third party even when the program executed on the main processor is hacked. From this reason, the master key Km and the work key Kw are stored in dedicated hardware for the security card, which is not easily accessed and altered from the main processor.

However, a possibility of hacking the above security systems becomes apparent, and an implementing method of a CAS or DRM with security level still higher than the above, has been studied. For example, it is proposed that the reception device downloads a program including CAS or DRM function, and that the program is updated in a device which handles security information, or is newly registered in a device handling security information (for example, refer to Kawakita et al., “A Downloadable Conditional Access System for Broadcasting”, Technical Report of the Institute of Image Information and Television Engineers, ITE Technical Report Vol. 36, No. 6, Feb. 9, 2012, hereinafter referred to as non-patent document 1). With this structure, even when a specific CAS or DRM is hacked, the reception device can eliminate a risk of the information leak according to the hacking by downloading a program with a new or improved CAS or DRM function.

In a scheme disclosed in the non-patent document 1, the CAS program or DRM program to be downloaded is also transmitted after being encrypted by a triple key scheme.

SUMMARY

In a case in which a program with functions, such as the CAS function, is transmitted by broadcast, when a broadcast station continuously broadcasts such a program, the ratio of the program to a broadcast band is too high, so that there is a possibility of affecting the normal broadcast. Then, a software download trigger table (SDTT) indicating information for notifying in advance of scheduled time of broadcasting of the program is inserted into a digital broadcast stream by time division multiplexing, and is transmitted. The reception device can detect in advance the broadcast schedule time when a program is to be transmitted by checking the SDTT, and prepare for reception of a program in accordance with the broadcast schedule time.

In order to execute all processes regarding an update or initial registration of the program on the security card, excessive processing capability is necessary for the security card, resulting in high cost. On the other hand, when processes regarding the update or initial registration of the program is carelessly executed on the main processor, the program may be hacked even though the program is updated. In view of above, it is desired to determine appropriately the role of the hardware which executes a process for an update or initial registration of the program handling confidential information.

According to one embodiment, a reception device is provided. The reception device includes: a receiver configured to receive a program being encrypted and handling confidential information, and a notification signal for notifying of delivery of the program and including delivery destination information for identifying a delivery destination of the program; a processor configured to determine whether the reception device is a delivery target of the program on the basis of the delivery destination information included in the notification signal, and prepare for receiving the program when the reception device is the delivery target of the program; and an information protection circuit configured to determine whether the reception device is a target of use of the program with reference to the identification information included in the program, and decrypt the program when the reception device is the target of use of the program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an operation flowchart of a CAS program receiving process.

DESCRIPTION OF EMBODIMENTS

A reception device according to one embodiment will be described below with reference to the drawings. The reception device is implemented, for example, as a system LSI, and includes as a part thereof an information protection unit which handles confidential information, separately from a main processor. The access to the information protection unit from outside the information protection unit is restricted, and a program for handling confidential information operates within the information protection unit.

For the update or new registration of the program for handling confidential information, the reception device receives an encrypted latest program for handling confidential information from another apparatus such as a broadcast station and decrypts the program to use the program. In this process, when a notification signal indicating that a program for handling confidential information is to be delivered is received, the main processor in the reception device determines whether the information protection unit included in the reception device is a target of the delivery of the program, by referring to the notification signal. When the information protection unit is a target of the delivery of the program, the main processor prepares for receiving the encrypted latest program for handling confidential information. When the reception device receives the program, the information protection unit decrypts the program to enable the use of the program. With this configuration, the reception device reduces the risk of confidential information being leaked at the time of update or new registration of the program and also reduces the processing load associated with the update or new registration on the information protection unit.

Figure 1:
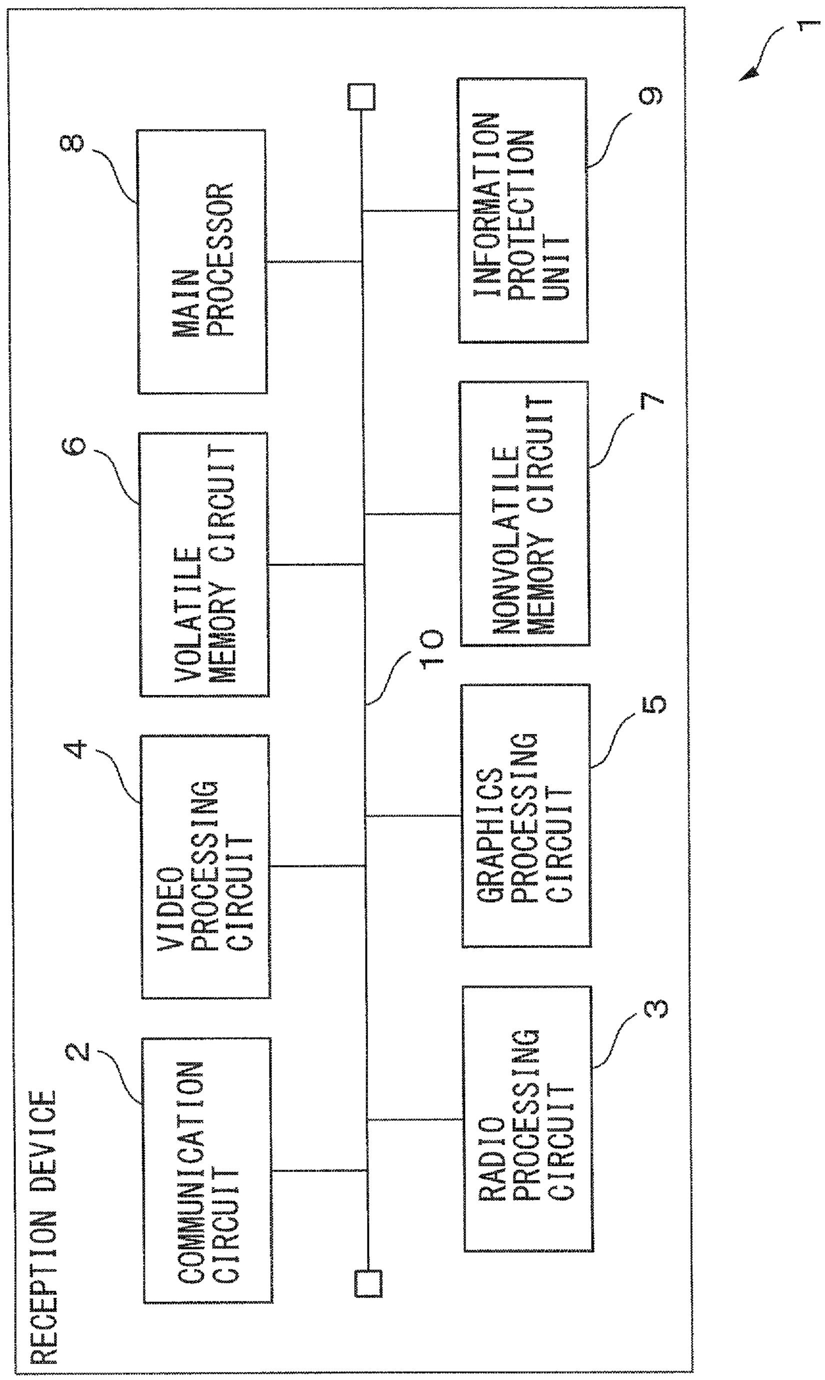
FIG. 1 is a diagram schematically illustrating a reception device according to one embodiment.

FIG. 1 is a diagram schematically illustrating the configuration of a reception device according to an embodiment.

A reception device 1 includes, for example, a communication circuit 2, a radio processing circuit 3, a video processing circuit 4, a graphics processing circuit 5, a volatile memory circuit 6, a nonvolatile memory circuit 7, a main processor 8, and an information protection unit 9. These units included in the reception device 1 are implemented, for example, as a single or a plurality of integrated circuits. These units included in the reception device 1 are interconnected so as to be able to communicate with each other via a bus 10. The reception device 1 can be incorporated in a variety of apparatuses, such as a mobile telephone, a portable information terminal, a computer, or a television receiver.

The communication circuit 2 is an example of a receiver unit. The communication circuit 2 is an interface circuit for connecting the reception device 1 to a communication network, such as the Internet, and transmits and receives information in accordance with the standard employed by the communication network. The communication network standard may be, for example, the Ethernet (registered trademark). The communication circuit 2 passes information received via the communication network to the main processor 8 or the information protection unit 9. The communication circuit 2 outputs information received from the main processor 8 or the information protection unit 9 onto the communication network.

The radio processing circuit 3 is another example of the receiver unit. The radio processing circuit 3 extracts information contained in a radio signal carried on a radio wave and received via an antenna (not depicted), and passes the extracted information to the main processor 8 or the information protection unit 9. The radio wave is, for example, a radio wave for a digital television broadcasting (hereinafter referred to as a digital TV broadcasting), and the radio signal contains, for example, an encrypted and compressed video stream for one or more channels. In this case, the radio processing circuit 3 is a tuner and extracts from the radio signal the encrypted and compressed video stream for the channel selected under the control of the main processor 8. The radio processing circuit 3 passes the encrypted and compressed video stream to the main processor 8.

Alternatively, the radio processing circuit 3 may be a circuit that extracts various kinds of information contained in a radio signal received from a base station, in accordance with a prescribed radio communication standard or generates a radio signal to be transmitted from an apparatus equipped with the reception device 1 to the base station.

Further, the communication circuit 2 and the radio processing circuit 3 may receive a stream containing an encryption key to be used to decrypt the encrypted video stream, a program which is encrypted and handles the confidential information, or an encryption key to be used to decrypt the program. In addition, the communication circuit 2 and the radio processing circuit 3 receive a notification signal indicating that delivery of the encrypted latest program for handling confidential information is scheduled.

The video processing circuit 4 reconstructs the video data by expanding the compressed video stream decrypted by the main processor 8, in accordance with the compression coding scheme used to compress the video stream. The video processing circuit 4 expands the video stream compressed, for example, by a compression coding scheme such as Moving Picture Experts Group (MPEG)-2, MPEG-4, or H.264 MPEG-4 AVC. The video processing circuit 4 passes the pictures contained in the reconstructed video stream to the graphics processing circuit 5 in a display order.

The graphics processing circuit 5 displays the pictures received from the video processing circuit 4 in the display order on a display device (not depicted) of the apparatus equipped with the reception device 1.

The volatile memory circuit 6 includes, for example, a dynamic memory, and temporarily stores information that various kinds of programs running on the reception device 1 handle.

The nonvolatile memory circuit 7 includes, for example, a nonvolatile random-access memory circuit such as Flash Memory (registered trademark) and a read-only memory circuit such as a mask ROM. The nonvolatile memory circuit 7 stores various kinds of information that need to be retained even when power to the reception device 1 is removed, and various kinds of programs that run on the reception device 1.

The nonvolatile memory circuit 7 also stores confidential information that the information protection unit 9 handles (for example, the encryption key to be used for decrypting the encrypted video stream, or the like) and the program to run on a sub processor 18 of the information protection unit 9 for handling confidential information. The confidential information and the program for processing confidential information are stored in the nonvolatile memory circuit 7, for example, after being encrypted by the use of a unique key generated or stored in the information protection unit 9. To use the confidential information and program, the information and program are first loaded into the information protection unit 9, and authenticated and decrypted in the information protection unit 9. Hence, it is difficult to use the confidential information and program without involving the information protection unit 9. In the following description, the program for handling confidential information is referred to as a CAS program for the sake of convenience. The CAS program is to be described later in detail.

The nonvolatile memory circuit 7 may also store a scan operation value for detection of alteration of confidential information.

The main processor 8 includes, for example, a logical operation circuit and a numerical operation circuit and executes various kinds of programs that run on the reception device 1. Further, when handling confidential information, the main processor 8 sends a prescribed command to the information protection unit 9. The command for accessing the information protection unit 9 is, for example, a bit string of a fixed or variable length, and contains at the head thereof command identification information represented by a bit string of a fixed length (for example, 4 to 8 bits) and indicating that the command is destined for the information protection unit 9. The command also contains, subsequent to the command identification information, a bit string of a fixed length (for example, 4 to 8 bits) indicating the command type and information for the execution of the command. The bit string indicating the command type is uniquely defined for each command type. The main processor 8 receives information for the execution of the program from the information protection unit 9. The main processor 8 carries out a prescribed process by the use of the information. For example, the main processor 8 may receive a scramble key Ks from the information protection unit 9 and decrypt an encrypted video stream.

When the reception device 1 receives a notification signal, the main processor 8 prepares for receiving the latest CAS program as needed, by referring to the notification signal.

The information protection unit 9 is a unit that performs processing related to confidential information, and is a tamper-proof module which is configured to make it difficult to externally access the various kinds of information and programs stored in the information protection unit 9 and illegally alter the confidential information and programs.

The information protection unit 9 holds confidential information such as personal information and a unique key to be used for encryption and decryption, in the information protection unit 9. The information protection unit 9 also encrypts the confidential information and the CAS program by the use of the unique key and stores the encrypted information and CAS program in the nonvolatile memory circuit 7. The information protection unit 9 carries out processes (for example, decryption of a work key Kw and the scramble key Ks) using the confidential information in accordance with the registered CAS program (specifically, the CAS program stored in the nonvolatile memory circuit 7 and is usable).

When the encrypted latest CAS program is received, the information protection unit 9 decrypts the CAS program as needed, and updates or registers the usable CAS program.

In this embodiment, the main processor 8 is permitted only particular control of the information protection unit 9. For example, there is no command between the main processor 8 and the information protection unit 9 that allows a program running on the main processor 8 to acquire, for example, a unique key handled by the information protection unit 9, and the information protection unit 9 only responds to a particular command. In addition, information that the main processor 8 can read from the information protection unit 9 is restricted.

Information that the main processor 8 can read from the information protection unit 9 is, for example, a list of CAS/DRM versions, identification information of the information protection unit 9, major version numbers and minor version numbers of program modules that operate in the information protection unit 9. The main processor 8 may also be able to acquire information indicating whether the program for handling confidential information has successfully been upgraded and the contents of the upgrade, from the information protection unit 9. The above-described information is to be described later in detail.

Figure 2:
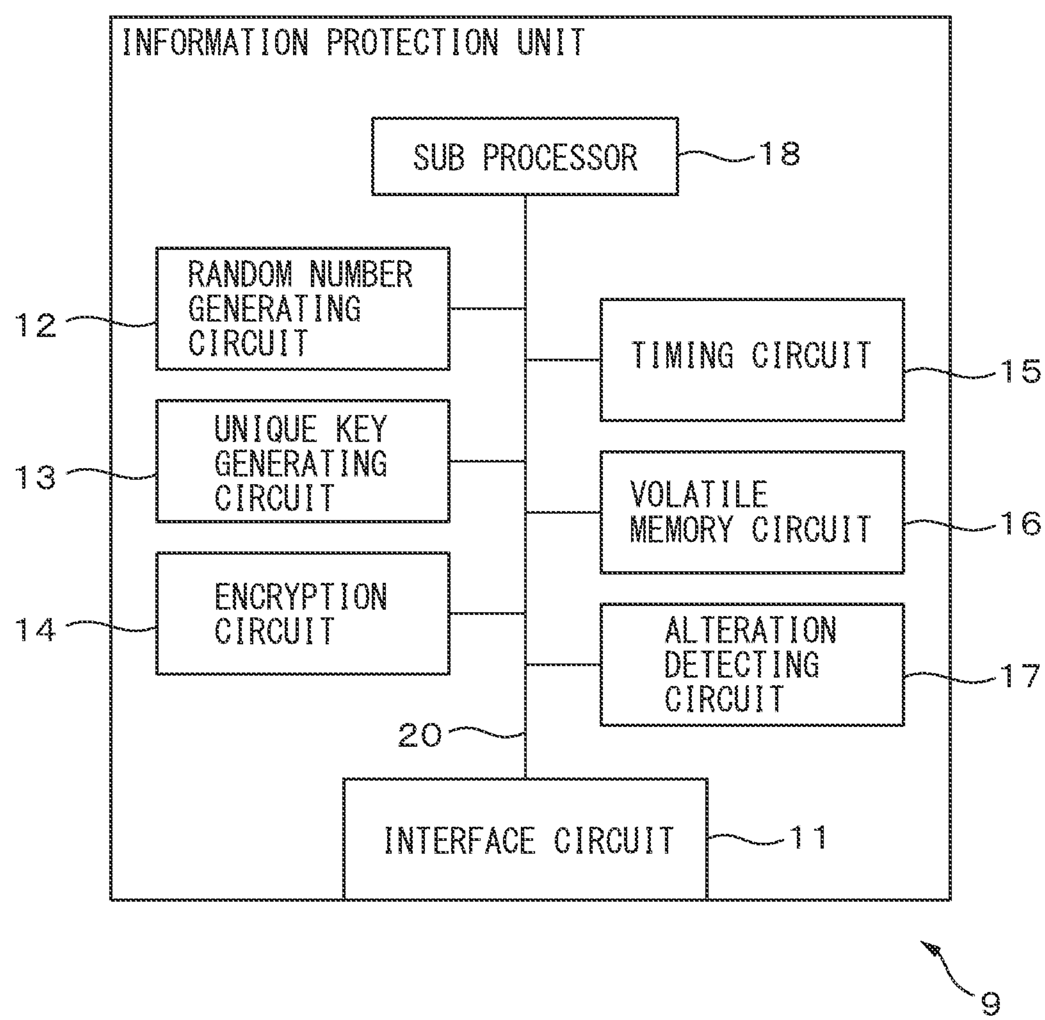
FIG. 2 is a diagram illustrating a hardware configuration of an information protection unit.

FIG. 2 is a diagram illustrating a hardware configuration of the information protection unit 9. The information protection unit 9 includes an interface circuit 11, a random number generating circuit 12, a unique key generating circuit 13, an encryption circuit 14, a timing circuit 15, a volatile memory circuit 16, an alteration detecting circuit 17, and the sub processor 18. These units included in the information protection unit 9 are interconnected so as to be able to communicate with each other via a bus 20 provided in the information protection unit 9. The random number generating circuit 12, the unique key generating circuit 13, the encryption circuit 14, the timing circuit 15, the volatile memory circuit 16, and the alteration detecting circuit 17 are accessible from the sub processor 18, but not accessible from outside the information protection unit 9. In other words, only the sub processor 18 knows address information for accessing each of the random number generating circuit 12, the unique key generating circuit 13, the encryption circuit 14, the timing circuit 15, the volatile memory circuit 16, and the alteration detecting circuit 17. On the other hand, the units located outside the information protection unit 9, including the main processor 8, have no knowledge of the address information for accessing any of the circuits contained in the information protection unit 9. When accessing any one of the circuits contained in the information protection unit 9, the sub processor 18 generates a command containing the address information of the desired circuit to be accessed and outputs the command onto the bus 20.

The interface circuit 11 is an interface for connecting the information protection unit 9 to the bus 10 of the reception device 1. When the bit string at the head of the bit string received via the bus 10 matches the command identification information indicating that the command is destined for the information protection unit 9, the interface circuit 11 passes the received bit string to the sub processor 18 via the bus 20. Further, the interface circuit 11 outputs information or the like from the sub processor 18 via the bus 20 onto the bus 10. The interface circuit 11 may be configured so that a signal output from any unit other than the sub processor 18 in the information protection unit 9 will not be output outside the information protection unit 9. To achieve this, the sub processor 18, for example, appends at the head of a bit string containing the information to be output from the sub processor 18 to the outside of the information protection unit 9 an identification bit string of a fixed length indicating that the information is destined for a device outside the information protection unit 9. Then, of the bit strings output on the bus 20, the interface circuit 11 outputs only the bit string containing the identification bit string to the outside of the information protection unit 9.

Further, when an initializing command containing a secret number for initializing the information protection unit 9 or enabling the use of an old version of a CAS program is received, via the bus 10, the interface circuit 11 passes the initializing command to the sub processor 18. The initializing command contains a bit string indicating that the command is a command for initializing the information protection unit 9, as a bit string indicating the command type.

One of a plurality of terminal pins provided on the reception device 1 may be connected to the sub processor 18 for input of the secret number. In this case, when the secret number is input via the secret number input pin, the information protection unit 9 is initialized or the use of the old version of the CAS program is enabled.

The random number generating circuit 12 generates a random number in accordance with a prescribed random number generating method. The random number generating circuit 12 may employ any one of various known random number generating methods for generating a random number by hardware or software.

The unique key generating circuit 13 generates one or more unique keys each represented by a prescribed bit string. The unique key is an example of confidential information and is used, for example, for encrypting or decrypting confidential information or for encrypting or decrypting the CAS program. Further, to ensure security of a specific key or the like of the information protection unit 9, the unique key can be used for encrypting the specific key together with the unique key. For example, the unique key generating circuit 13 generates, for example, a unique key to be used for decrypting the CAS program, as the unique key. A master key Km and a key Kb to be used for decrypting the CAS program may be encrypted with the unique key and stored in the nonvolatile memory circuit 7. The unique key generating circuit 13 may include a nonvolatile memory circuit, and the nonvolatile memory circuit may store the unique key, the master key Km and the key Kb to be used for decrypting the CAS program.

The encryption circuit 14 encrypts the confidential information that the information protection unit 9 handles or the CAS program, or decrypts the encrypted confidential information or the encrypted CAS program, in accordance with a prescribed encryption scheme. The encryption scheme employed by the encryption circuit 14 may be any one of various known common key encryption schemes such as DES and AES, or any one of various known public key encryption schemes such as RSA and elliptic curve DSA. The encryption circuit 14 may be configured to support more than one encryption scheme. Further, the encryption circuit 14 may include a circuit for computing hash values for various kinds of information in accordance with a hash function.

When the sub processor 18 is configured to also perform processing such as encryption/decryption of confidential information or the CAS program or hash value computation in accordance with a program that runs on the sub processor 18, the encryption circuit 14 may be omitted.

The timing circuit 15 is a circuit that supplies a timing signal to each unit in the information protection unit 9. For example, when a clock signal for driving the entire reception device 1 is input via an input terminal pin on the timing circuit 15, the timing circuit 15 is driven by the clock signal. Since the timing circuit 15 is not directly accessible from outside the information protection unit 9, the timing signal supplied from the timing circuit 15 is a highly reliable signal difficult to alter. Therefore, the timing signal supplied from the timing circuit 15 may be used outside the information protection unit 9.

The timing signal supplied from the timing circuit 15 (hereinafter referred to as the high-reliability timing signal for the sake of convenience) is used by the sub processor 18, for example, to check the time limit set for content viewing. Alternatively, the high-reliability timing signal may be used by the CAS program or other programs that run on the sub processor 18.

The volatile memory circuit 16 includes, for example, a static memory and temporarily stores at least a portion of the currently executing programs as well as the information that the information protection unit 9 handles.

Every time the information protection unit 9 reads information from the nonvolatile memory circuit 7, the alteration detecting circuit 17 determines whether the read information has been altered. For example, the alternation detecting circuit 17 computes a scan operation value by executing a prescribed scan program to perform a prescribed operation onto the read information. The alteration detecting circuit 17 then compares the obtained scan operation value and a scan operation value obtained for the information in the past. When the two scan operation values are the same, the alteration detecting circuit 17 determines that no alteration has been made to the read information. On the other hand, when the two scan operation values are different from each other, the alteration detecting circuit 17 determines that alternation has been made to the read information, and notifies the sub processor 18 that the read information has been altered. The sub processor 18 outputs an instruction to stop the programs being executed, to the main processor 8.

The scan program operates to cause the alteration detecting circuit 17 to compute the hash value of the read information as a scan operation value. Alternatively, the scan program operates to cause the alteration detecting circuit 17 to compute a scan operation value by performing numerical operation, logical operation, or the combination of numerical operation and logical operation on the read information.

The scan operation value is not limited to the above-described example and may be any of various values computed on the basis of the information to determine whether information has been altered.

When the sub processor 18 is to store confidential information or the CAS program in the nonvolatile memory circuit 7, the alteration detecting circuit 17 computes a scan operation value of the confidential information or the CAS program. The scan operation value is then stored in the nonvolatile memory circuit 7 via the sub processor 18 and the main processor 8. When the information protection unit 9 includes a nonvolatile memory circuit in the information protection unit 9, the scan operation value may be stored in the nonvolatile memory circuit in the information protection unit 9.

The sub processor 18 includes, for example, a logical operation circuit and a numerical value operation circuit, and executes programs related to the confidential information, in accordance with the CAS program that runs on the sub processor 18.

For example, when the reception device 1 receives a video signal encrypted in accordance with a CAS scheme and then reconstructs the video signal, the sub processor 18 decrypts the encrypted work key Kw received from the main processor 8, with the master key Km. The sub processor 18 then decrypts the encrypted scramble key Ks with the work key Kw. The sub processor 18 outputs the scramble key Ks to the main processor 8. The sub processor 18 may cause the encryption circuit 14 to decrypt one of or both the work key Kw and the scramble key Ks.

When the reception device 1 receives the encrypted latest CAS program, the sub processor 18, as needed, decrypts the CAS program, and updates the CAS program that has been used, with the decrypted CAS program, or registers the decrypted CAS program.

Description is given below of the details of a process in which the reception device 1 receives the CAS program.

Figure 3:
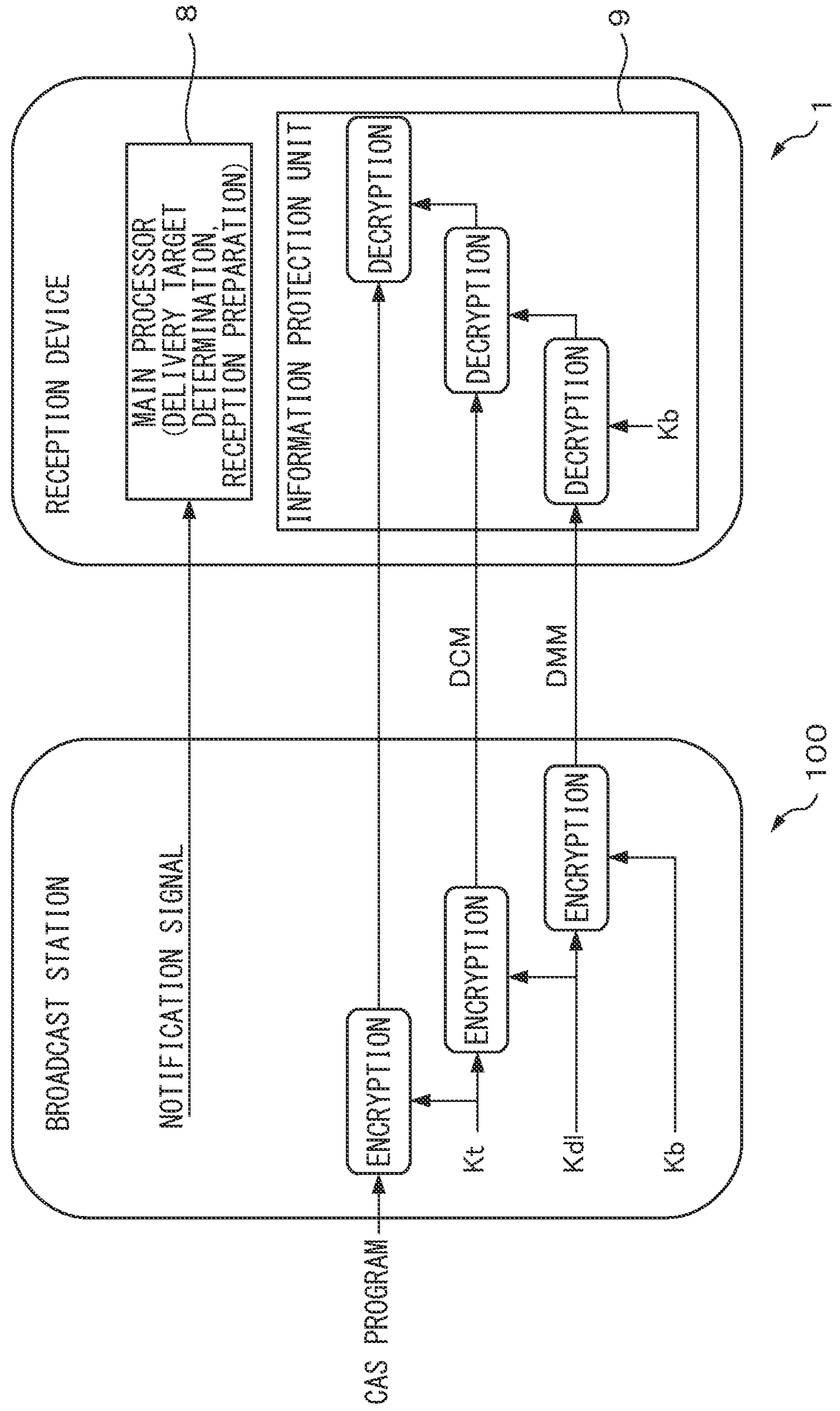
FIG. 3 is a diagram illustrating an overview of a CAS program receiving procedure.

FIG. 3 is a diagram illustrating an overview of a procedure for receiving the CAS program. First, before transmission of the CAS program, a broadcast station 100 transmits a notification signal notifying that the CAS program is to be transmitted. The notification signal is transmitted, for example, by being multiplexed into a digital broadcast stream by time division multiplexing. The radio processing circuit 3 of the reception device 1 receives the digital broadcast stream containing the notification signal and passes the digital broadcast stream to the main processor 8. In this case, the notification signal may be, for example, SDTT. The broadcast station 100 may transmit the notification signal a plurality of times regularly or irregularly.

Alternatively, the notification signal may be transmitted by being multiplexed by time division multiplexing into a data stream to be transmitted via a communication network such as the Internet. In this case, the communication circuit 2 of the reception device 1 receives the data stream containing the notification signal and passes the data stream to the main processor 8.

Figure 4:
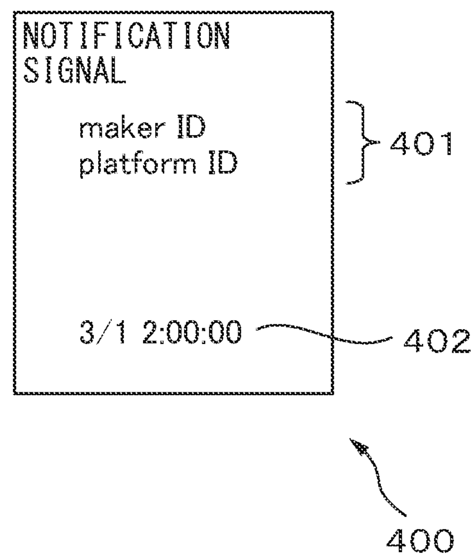
FIG. 4 is a diagram illustrating a list of information items contained in a notification signal.

FIG. 4 provides a list of information items contained in a notification signal. A notification signal 400 contains information 401 identifying a target of delivery of the CAS program to be transmitted, such as a maker ID and a platform ID. The maker ID is information identifying the maker or manufacturer of the information protection unit 9. The platform ID is information identifying the platform that the information protection unit 9 supports. In the following description, the maker ID, the platform ID, and individual identification information of each information protection unit 9, which is information uniquely set for the information protection unit 9 and identifying the information protection unit 9 itself, are referred to as a CAS base ID for the sake of convenience.

The notification signal 400 may contain CAS program version information. The version information is information indicating the possibility of version upgrade of the CAS program for each information protection unit 9. Note that the information protection unit 9 does not necessarily upgrade the version of the CAS program. In addition, the notification signal 400 contains transmission time and date information 402 indicating the time and date at which delivery of the CAS program is scheduled.

The main processor 8 of the reception device 1, which receives the notification signal reads the CAS base ID from the information protection unit 9. The main processor 8 compares the read CAS base ID and the CAS base ID contained in the notification signal.

When the read CAS base ID of the information protection unit 9 matches the CAS base ID contained in the notification signal, the main processor 8 determines that version upgrade of CAS program is needed. When the CAS program version information is contained in the notification signal and the read CAS base ID of the information protection unit 9 matches the CAS base ID contained in the notification signal, the main processor 8 reads the version information of the registered (i.e., currently used) CAS program from the information protection unit 9. The main processor 8 compares the read CAS program version information and the CAS program version information contained in the notification signal to determine whether version upgrade of the CAS program is needed. For example, when the number indicated by the CAS program version information contained in the notification signal is larger than or equal to the number indicated by the CAS program version information read from the information protection unit 9, the main processor 8 determines that version upgrade of the CAS program is needed. Conversely, when the number indicated by the CAS program version information contained in the notification signal is smaller than the number indicated by the CAS program version information read from the information protection unit 9, the main processor 8 determines that version upgrade of the CAS program is not needed.

When determining that version upgrade of the CAS program is needed, the main processor 8 prepares for receiving the CAS program scheduled to be delivered. To receive the CAS program delivered by broadcast, the main processor 8 sets, as preparation for receiving the CAS program, a timer circuit (not depicted) in the reception device 1 at the scheduled time and date indicated by the transmission time and date information contained in the notification signal. At the scheduled time and date, the reception device 1 is automatically turned on. The main processor 8 stores, in the nonvolatile memory circuit 7, the processing operations to be performed when the reception device 1 is turned on due to the timer circuit. When the CAS program is delivered via a communication network such as the Internet, the main processor 8 may receive the CAS program at a certain time via the communication network without setting the timer circuit at the scheduled time and date. In this case, the main processor 8 may set, as preparation for receiving the CAS program, the scheduled time of reception at the certain time, and access the server to deliver the CAS program via the communication network, at the scheduled time of reception.

When the CAS program is transmitted by broadcast, the CAS program is normally transmitted to the reception device 1 by a method referred to as data carousel, in which the CAS program is repeatedly transmitted at prescribed time. When the broadcast station 100 delivers the CAS program via a communication network, the reception device 1 may receive the CAS program via the internet communication network.

Refer to FIG. 3 again. The broadcast station 100 encrypts the CAS program by a triple-key encryption scheme and transmits the encrypted CAS program. For example, the broadcast station 100 encrypts the CAS program with a transmission path protection key Kt. The broadcast station 100 then encrypts the transmission path protection key Kt with a download key Kdl. The broadcast station 100 further encrypts the download key Kdl with the unique key (hereinafter referred to as a CAS base key for the sake of convenience) Kb of the information protection unit 9. The identification information of the information protection unit 9 or the CAS base key Kb linked to the identification information of the information protection unit 9 is assigned on a maker-by-maker basis or a platform-by-platform basis, for example.

The broadcast station 100 transmits, separately from the encrypted CAS program, information for decrypting the encrypted CAS program, for example, the transmission path protection key Kt and the download key Kdl. For example, the broadcast station 100 includes the CAS base ID, the download key Kdl encrypted with the CAS base key Kb, a Kdl identification number identifying the download key Kdl, and the like in a packet referred to as download management message (DMM). The broadcast station 100 includes the transmission path protection key Kt encrypted with the download key Kdl and the Kdl identification number in a packet referred to as download control message (DCM). The DMM and DCM are examples of a signal for decryption. The broadcast station 100 transmits a plurality of DMM packets and DCM packets at different time by multiplexing, by time division multiplexing, the packets into a digital broadcast stream or a data stream to be transmitted via a communication network. This is because, since the information amount of the DMM packets and DCM packets is small, the ratio of the information amount of the packets to the transmission capacity is small even when the packets are repeatedly transmitted, and hence it is unnecessary to transmit any "notification signal" and to transmit the packets at a "notified time" different from the case of the encrypted CAS program.

When the reception device 1 receives the DMM, the main processor 8 passes the CAS base ID, the encrypted download key Kdl, and the Kdl identification number contained in the DMM, to the information protection unit 9. The sub processor 18 of the information protection unit 9 reads the CAS base ID registered in advance from the nonvolatile memory circuit 7, and compares the read CAS base ID with the CAS base ID contained in the DMM. When the CAS base ID registered in advance matches the CAS base ID contained in the DMM, the sub processor 18 acquires the CAS base key Kb from the unique key generating circuit 13 and decrypts the download key Kdl with the CAS base key Kb. The sub processor 18 may pass the encrypted download key Kdl and the CAS base key Kb to the encryption circuit 14 to cause the encryption circuit 14 to decrypt the download key Kdl. The sub processor 18 stores the decrypted download key Kdl in the volatile memory circuit 16. The sub processor 18 also stores the Kdl identification number in the volatile memory circuit 16.

When the reception device 1 receives the DCM, the main processor 8 extracts, from the DCM, a transmission path protection key Kt encrypted with the download key Kdl and the Kdl identification number, and passes the extracted key number to the information protection unit 9.

The sub processor 18 compares the Kdl identification number stored at the time of receiving the DMM with the Kdl identification number contained in the DCM. When the Kdl identification number stored at the time of receiving the DMM matches the Kdl identification number contained in the DCM, the sub processor 18 decrypts the transmission path protection key Kt contained in the DCM, with the download key Kdl. The sub processor 18 stores the transmission path protection key Kt in the volatile memory circuit 16.

Then, the reception device 1 receives the encrypted CAS program from the broadcast station by broadcast or via a communication network. The main processor 8 passes the received, encrypted CAS program to the information protection unit 9.

Figure 5:
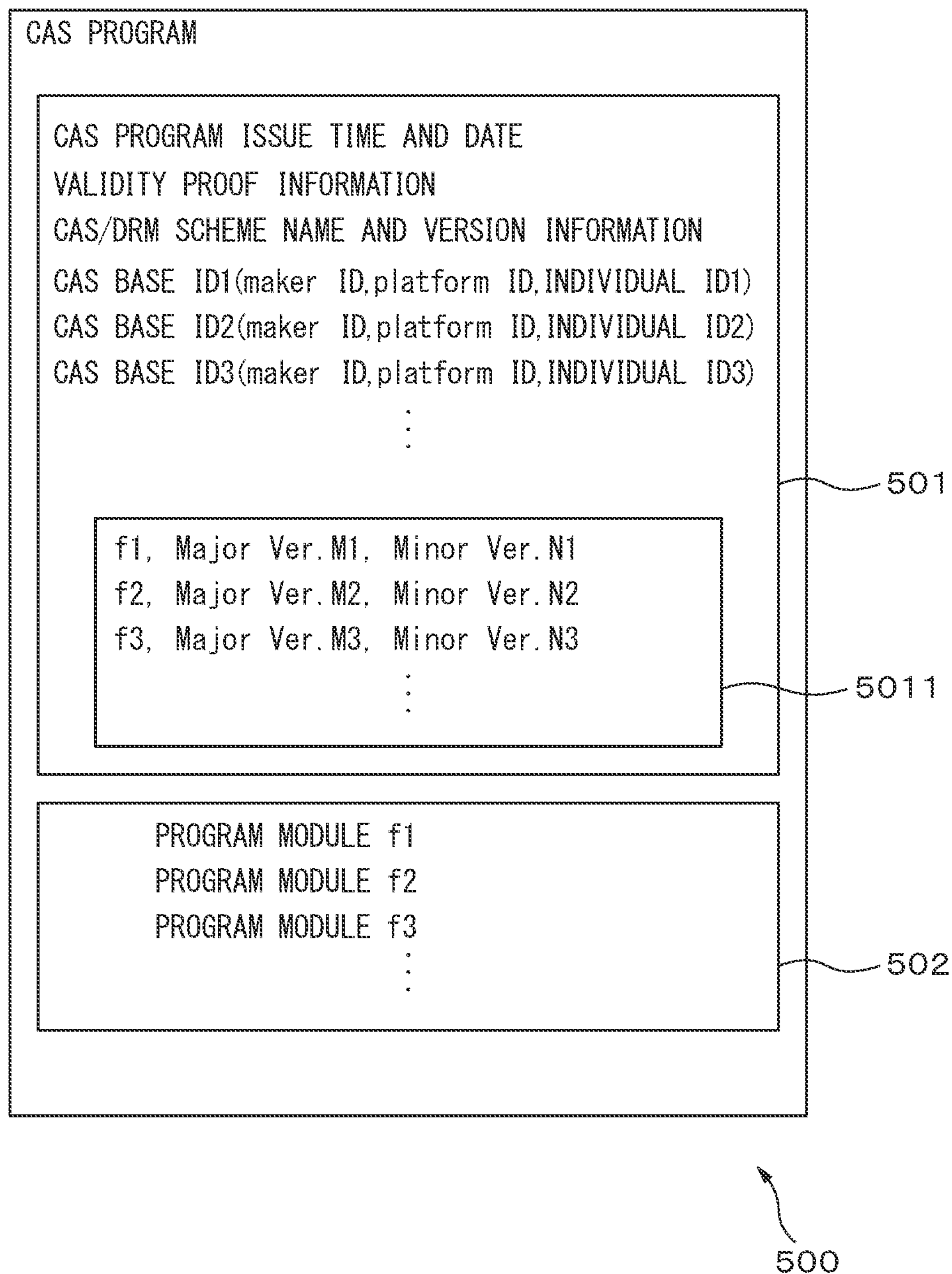
FIG. 5 is a diagram illustrating an example of a CAS program.

FIG. 5 is a diagram illustrating an example of the CAS program. A CAS program 500 is divided into additional information 501 and a program main body 502. The additional information 501 is information to be used by the information protection unit 9 for managing the CAS program. As illustrated in FIG. 5, the additional information 501 contains, for example, the following kinds of information.

(1) CAS program issue time and date, and information for proving the validity of the CAS program (for example, a digital signature or information for alteration detection such as a hash value)

(2) The name of the confidential-information processing scheme employed in the CAS program (for example, the name of the employed CAS or DRM scheme), and version information of the scheme (3) CAS base ID (maker ID, platform ID, and individual identification information of the information protection unit 9)

(4) The names, the major version numbers, and the minor version numbers of individual program modules (firmware) contained in the CAS program The information protection unit 9 determines whether the device in which the information protection unit 9 is included is a target of use of the received CAS program, on the basis of the above-described additional information, and, as needed, determines, for each program module contained in the CAS program, whether to update the program module.

For example, the information protection unit 9 determines whether the device in which the information protection unit 9 is included is a target of use of the received CAS program, of the basis of the CAS base ID. When the CAS program is designed for a plurality of kinds of information protection units, the CAS program indicates the target of application, for each of the plurality of kinds of information protection units 9. In such a case, the additional information may contain a plurality of CAS base IDs in this embodiment. For example, the additional information 501 contains "maker ID, platform ID, individual ID 1", "maker ID, platform ID, individual ID 2", and so on as CAS base IDs. When any of the plurality of CAS base IDs contained in the additional information matches the CAS base ID of the device in which the information protection unit 9 is included, the information protection unit 9 can determine that the device is a target of use of the CAS program.

The additional information 501 also contains a list 5011 of program modules contained in the CAS program. The list 5011 includes, for each program module to be updated, an individual function number fi (i=1, 2, 3, . . . ), a major version number Mi, and a minor version number Ni. By referring to the list 5011, the sub processor 18 acquires the number of program modules contained in the received CAS program. By referring to the major version number and the minor version number of each program module, the sub processor 18 can determine whether or not to update or register the program module.

The entire additional information may be encrypted together with the CAS program main body, or part of the additional information or the entire additional information may not be encrypted. For example, in the example illustrated in FIG. 5, only the list 5011 of the additional information 501 may be encrypted. When the additional information is not encrypted, the sub processor 18 of the information protection unit 9 can determine whether the received CAS program is related to the device in which the information protection unit 9 is included, without decrypting the entire CAS program. When the received CAS program is not related to the device, the sub processor 18 can discard the received CAS program without decrypting the program main body, consequently reducing the processing amount.

The sub processor 18 may be configured to notify, after discarding the CAS program, the main processor 8 of the discard.

The program main body 502 is encrypted and transmitted. The program main body 502 includes one or a plurality of encrypted program modules as needed.

The CAS program delivered by a broadcast station is encrypted by the transmission path protection key Kt. The sub processor 18 decrypts the encrypted CAS program with the transmission path protection key Kt. The sub processor 18 re-encrypts the decrypted CAS program with a unique key generated by the unique key generating circuit 13 and stores the re-encrypted CAS program in the nonvolatile memory circuit 7. As described above, the CAS program contains the program main body and the additional information. By referring to the additional information obtained by decrypting the CAS program, the sub processor 18 carries out the following processes when decrypting or storing the program main body.

First, the sub processor 18 checks information that is contained in the additional information and is for proving the validity of the entire CAS program. This information is a digital signature or information for alteration detection. When the information for proving the validity of the entire CAS program fails to prove the validity of the received CAS program, the sub processor 18 stops processes such as decryption and notifies the main processor 8 of the stop. The main processor 8 outputs, for example, a message indicating that an illegal CAS program has been received, to the graphics processing circuit 5. The graphics processing circuit 5 superimposes the message onto a video to be output from the video processing circuit 4, to thereby notify the viewer of the reception of the illegal CAS program.

On the other hand, when the information proving the validity of the entire CAS program can prove the validity of the received CAS program, the sub processor 18 compares the CAS base ID registered in advance (i.e., stored in the nonvolatile memory circuit 7) and the CAS base ID contained in the additional information. For example, when at least one of the maker ID and the platform ID of the CAS base ID does not match, the sub processor 18 stops the process of decrypting the CAS program main body. The sub processor 18 then notifies the main processor 8 that inappropriate information not targeting the reception device 1 has been received.

When both the maker ID and the platform ID match, on the other hand, the sub processor 18 checks the CAS or DRM scheme name contained in the additional information of the received CAS program, and the version numbers related to the scheme. When the CAS or DRM scheme name is different from that registered in advance, or when each version number is larger than that of the CAS program registered in advance, the sub processor 18 stores the above scheme name in the nonvolatile memory circuit 7. The sub processor 18 also re-encrypts each decrypted program module with a unique key and stores the re-encrypted program module in the nonvolatile memory circuit 7. The sub processor 18 also stores the major version number and the minor version number of each program module contained in the decrypted CAS program, in the nonvolatile memory circuit 7.

On the other hand, when the above scheme name and version numbers contained in the additional information match those registered in advance, the sub processor 18 compares the version numbers (both major and minor) of each program module contained in the additional information, with those registered in advance. The sub processor 18 updates each program module having at least one of the major version number and the minor version number contained in the additional information larger than the corresponding one of the major version number and the minor version number registered in advance.

Each program module is a program implementing one or some of the plurality of functions of the CAS program. When the CAS program has only a single function, only a single program module may be defined. When a new individual function number not registered in advance is contained in the additional information, the individual function number indicates that a new function is added to the CAS program. Each program module is described later.

In this embodiment, the major version number and the minor version number have the following meanings.

Specifically, when the major version number contained in the additional information is larger than the major version number registered in advance, the sub processor 18 keeps the old versions of the program modules. The sub processor 18 then also stores the new versions of the program modules contained in the received CAS, in the nonvolatile memory circuit 7. With this configuration, when a problem occurs in the new version of the CAS program, the reception device 1 can use the old version of the CAS program. The old version of the CAS program may be deleted after operation check of the new version of the CAS program.

When the minor version number contained in the additional information is larger than the minor version number registered in advance, the sub processor 18 immediately or optionally delete the old versions of the program modules. The sub processor 18 then stores the new version of the CAS program in the nonvolatile memory circuit 7.

The individual program modules correspond to the following functions when the CAS program supports, for example, B-CAS.

(1) the function of decrypting the scramble key Ks and the work key Kw to be used for decrypting a video stream (2) the function of displaying individual contract (providing the number of contract channels on the basis of the number of the registered work keys Kw in the case of B-CAS)

(3) the function of setting B-CAS critical data (critical confidential information); the critical data in the case of B-CAS scheme is, for example, a B-CAS individual viewer ID (referred to as card ID), the work key Kw, or the master key Km, and the critical data setting function is the function of updating part of the critical data or the entire critical data As an example of update of critical data, it is assumed that a B-CAS card is hacked and the master key Km of the B-CAS card is leaked out. Since the work key Kw is transmitted after being encrypted with the master key Km, there is a possibility, when the master key Km is leaked out, that the work key Kw used for viewing one or more pay channels contracted with the viewer provided with the master key Km. When the work key Kw is disclosed to the public, for example, on the Internet, anyone may be able to view the pay channels related to the work key Kw for free. The only measures to take in such a case are to update the master key Km. It is conceivable in this case to update the master key Km by the use of the function of downloading the CAS program.

To enable update of the master key Km by the CAS program, a CAS is to be specified for each viewer, in the B-CAS scheme or the like. For this reason, the CAS program can divert B-CAS individual viewer IDs, for example. Specifically, the program module for critical data update compares a B-CAS individual viewer ID defined in the program module and the B-CAS individual viewer IDs stored in the nonvolatile memory circuit 7. Only when there is a match, the program module updates the master key Km with a new master key.

The program module for critical data update may use information that can identify each information protection unit 9, for example, individual identification information of the information protection unit 9, instead of a B-CAS individual viewer ID.

In the following, an example of the program module for critical data update is provided.

If CAS base individual identification=xxxxxx, then Km=yyyyy

If CAS base individual identification=xxxxx1, then Km=yyyy1

If CAS base individual identification=xxxxx2, then Km=yyyy2

If CAS base individual identification=xxxxx3, then Km=yyyy3

If CAS base individual identification= . . . , then Km= . . .

If CAS base individual identification= . . . , then Km= . . .

If CAS base individual identification=xxxxxn, then Km=yyyyn

The above-described program module updates, when the CAS base individual identification (specifically, the individual identification information of the information protection unit 9) is a prescribed ID (for example, xxxxx1), the master key Km with that corresponding to the individual identification information (for example, yyyy1). When the reception device 1 receives a CAS program containing such a program module and the CAS program is decrypted in the information protection unit 9, the sub processor 18 updates the corresponding master key Km upon matching of the individual identification information of the information protection unit 9 with any of specified individual identification information items. In this case, since only a viewer is affected, the minor version number may be updated as the version number of the program module.

In another case, for update of a program module including modification of a minor bug in the CAS program (for example, CAS program processing speedup), the version number to be updated may be the minor version number.

On the other hand, modification of the major version number is made, for example, for modification of a CAS program that affects many viewers. An example of such a case is that, when a serious problem (for example, a security hole that a command for reading the master key from the main CPU exists due to an error in the development of the CAS program) is found in the CAS scheme, and the CAS programs of all the viewers need to be modified. It is not realistic to modify the CAS programs of all the viewers located at various different places, at the same time. Even when a new CAS program is broadcasted to all, there is a high possibility that some viewers fail to receive the CAS program. When different CAS programs exist for a plurality of CAS bases (makers and platforms) as new CAS programs, and some of the CAS programs, which are all new, may not operate normally. By storing the old version of the CAS program together with the new CAS program in the nonvolatile memory circuit 7 via the information protection unit 9, it is possible to minimize the inconvenience of each viewer even when deficiency occurs in the new CAS program.

When a serious problem of the CAS program as that described above is found, the following concrete modification operations are conceivable.

First, the CAS program for which the major version number is updated is received by the reception device 1, and the information protection unit 9 decrypts the CAS program.

Then, an EMM (including the encrypted work key Kw) and an ECM (including the encrypted scramble key Ks) corresponding to the CAS program for which the major version number is updated are broadcasted. The sub processor 18 of the information protection unit 9 then executes the CAS program to decrypt the keys.

In this operation, the sub processor 18 may not be able to decrypt the work key and the like in a reception device including only the old version of the CAS program or a reception device including a new CAS program with failure.

In this case, the viewer is suddenly disabled from viewing a video on the reception device not able to decrypt the work key and the like. The viewer then makes inquiries to the related broadcast supplier, to ask the supplier to solve the problem.

In response to the viewer inquiries, the inquired broadcast supplier checks the identification information of the information protection unit 9 incorporated in the reception device of the viewer as well as the major version number and the minor version number of each program module of the CAS program. When it is difficult for the broadcast supplier to immediately solve the problem, the broadcast supplier notifies the viewer of a secret number or the like to activate the old version of the CAS program. The viewer inputs the secret number via a user interface (not depicted) such as an operation button of the reception device 1. Alternatively, a packet containing the secret number may be transmitted by broadcast or via a communication network, and the main processor 8 may input an initializing command containing the secret number to the information protection unit 9. Alternatively, the broadcast station may include the secret number in part of the CAS program at the time of delivering the CAS program.

The "secret number" is preferably different for each viewer. The secret number may be set at a value obtained, for example, by performing a prescribed operation (for example, hash operation) on the B-CAS individual viewer ID (referred to as card ID) of the viewer. By setting a different secret number to each viewer, it is possible to prevent a problem that any viewer other than a target viewer sets the CAS program back to the old version without permission by the use of the secret number. This consequently prevents a situation where the broadcast station is disabled to update the old version of the CAS program with failure with a new version of the CAS program at their will, and also prevents a situation where a viewer continues using the old version of the CAS program with failure at his/her own will.

The period in which the old version of the CAS program is usable by the use of a secret number is also preferably limited due to the same reason as above. The period in which the old version of the CAS program is usable is preferably set, for example, at a prescribed period starting upon input of the secret number into the information protection unit 9. Time information indicating the current time is superimposed on a broadcast signal, and the above "period limitation" function can be enabled by the use of this time information. Specifically, the sub processor 18 identifies the time of the input of the secret number from the broadcast signal and sets the time period in which the old version of the CAS program can be used, at the time period obtained by adding a desired time period to a time period specified in advance (for example, several weeks) starting from the identified time. The sub processor 18 constantly monitors the time information contained in a broadcast signal during the use of the old version of the CAS program and notifies, when the period in which the use is permitted has passed, the main processor 8 of the expiration, to prohibit the use of the old version of the CAS program.

In the above case, a work key and the like need to be transmitted by the use of an EMM and an ECM for the old version that the old version of the CAS program can use. The broadcast station broadcasts, for example, the ECM and the EMM for the old version of the CAS program together with an ECM and an EMM for a new version of the CAS program. The broadcast station further provides the function of specifying, for the information protection unit 9, the identification numbers of digital signal packets for key information transmission, such as an ECM and an EMM.

Each digital signal packet for key information transmission, such as an ECM or an EMM, normally contains a packet identification number around the head of the packet. The main processor 8 identifies digital AV information and information such as the ECM and the EMM in a digital broadcast signal by referring to the packet identification numbers. The ECM and the EMM transmitted to the information protection unit 9 are normally packets identified by the main processor 8.

In this embodiment, in the period where the old version of the CAS program is usable, the information protection unit 9 notifies the main processor 8 of the digital signal packet identification number for key information transmission related to the version of the CAS program to be used. The main processor 8 passes the digital signal packet with the identification number, to the information protection unit 9. Through this operation, the information protection unit 9 receives the ECM and the EMM for the old version of the CAS program from the main processor 8, and decrypts the work key and the like in accordance with the old version of the CAS program. After the period in which the old version of the CAS program is usable has passed, the information protection unit 9 performs the operation for decrypting the work key and the like included in the ECM and the EMM for the new version of the CAS program, by the use of the new version of the CAS program. Wherein, the reception device 1 receives the new version of the CAS program that operates normally, before the period in which the old version of the CAS program is usable passes, which allows the information protection unit 9 to be able to use the new version of the CAS program. After the operation check of the new version of the CAS program, the old version of the CAS program may be deleted from the nonvolatile memory circuit 7.

According to a modified example, the main processor 8 may receive the transmission path protection key Kt from the information protection unit 9, decrypt the encrypted CAS program, and pass the decrypted CAS program to the information protection unit 9. In this case, as in the above-described embodiment, the sub processor 18 of the information protection unit 9 re-encrypts the decrypted CAS program main body and additional information with the unique key, and stores the re-encrypted CAS program main body and additional information in the nonvolatile memory circuit 7.

According to another modified example, a CAS program may be broadcasted from a broadcast station by being double encrypted with an inner encryption key Kx as well as the transmission path protection key Kt. In this case, the inner encryption key Kx may also be transmitted to the reception device 1 in the same method as the method of transmitting the transmission path protection key Kt, and decrypted at the information protection unit 9. For example, the encrypted inner encryption key Kx is also contained in the DCM packet together with the transmission path protection key Kt, and the inner encryption key Kx is decrypted with the download key Kdl as the transmission path protection key Kt being decrypted with the download key Kdl.

Alternatively, the inner encryption key Kx may be transmitted in a DCM dedicated for the inner encryption key Kx instead of being transmitted with the transmission path protection key Kt in a single DCM. In this case, the transmission path protection key Kt is transmitted in a DCM for the transmission path protection key Kt, and the inner encryption key Kx is transmitted in the DCM for the inner encryption key Kx.

Even when the inner encryption key Kx and the transmission path protection key Kt are both contained in a single DCM, an algorithm for decrypting the transmission path protection key Kt and an algorithm for decrypting the inner encryption key Kx may be different from each other. For example, by performing DES encryption on the transmission path protection key Kt and AES encryption on the inner encryption key Kx, the independence of the transmission path protection key Kt and the inner encryption key Kx can be increased. With this configuration, the security in transmission of the CAS program can be improved.

The double encryption scheme with the transmission path protection key Kt and the inner encryption key Kx is effectively used for the purpose of, for example, using the transmission path protection key Kt for the protection of the encrypted CAS program in the transmission path while using the inner encryption key Kx for the protection of the CAS program in the reception device 1. This enables the secure process in the transmission path and the secure process in the receiver terminal to be separated.

For example, it is possible to use the inner encryption key Kx as a dedicated key for the information protection unit 9 that is never be used outside the information protection unit 9. Never being used outside the information protection unit 9 also includes the situation where the key is encrypted with a unique key used only in the information protection unit 9 and is then output from the information protection unit 9 or is then stored in the nonvolatile memory circuit 7 or the like outside the information protection unit 9. On the other hand, the transmission path protection key Kt is used outside the information protection unit 9 of the reception device 1, as a key for transmission path protection. The main processor 8 may perform a large-capacity secure process related to a transmission path (for example, transmission error correction) by the use of the transmission path protection key Kt. Meanwhile, the information protection unit 9 may perform a process related to a CAS program with a smaller processing amount, by the use of the inner encryption key Kx.

There are transmission path protection (such as transport layer security (TLS)) used in a communication network. For this reason, when an encrypted CAS program is transmitted via a communication network such as the Internet, encryption of the CAS program with the transmission path protection key Kt may be omitted. In this case, the CAS program may be transmitted by being encrypted only with the inner encryption key Kx and then passed to the information protection unit 9.

FIG. 6 is an operation flowchart of a CAS program receiving process. When a notification signal is received, the main processor 8 determines whether the information protection unit 9 of the reception device 1 is a delivery target of a CAS program scheduled to be delivered, on the basis of a CAS base ID contained in the notification signal (Step S101). When the information protection unit 9 is not a delivery target of a CAS program delivery target (No in Step S101), the main processor 8 terminates the CAS program receiving process.

On the other hand, when the information protection unit 9 is a CAS program delivery target (Yes in Step S101) and CAS program version information is contained in the notification signal, the main processor 8 determines whether or not the number indicated in the version information is larger than or equal to the number indicated in CAS program version information registered in advance (Step S102). When the number indicated in the CAS program version information contained in the notification signal is smaller than the number indicated in the CAS program version information registered in advance (No in Step S102), this indicates that the information protection unit 9 is using a newer version of the CAS program than that scheduled to be delivered. Hence, the main processor 8 terminates the CAS program receiving process.

On the other hand, when the number indicated in the CAS program version information contained in the notification signal is larger than or equal to the number indicated in the CAS program version information read from the information protection unit 9 (Yes in Step S102), the main processor 8 prepares for receiving the CAS program (Step S103).

When the reception device 1 receives a packet, such as a DCM or a DMM, that contains an encryption key to be used for decrypting the CAS program, the main processor 8 passes the packet to the information protection unit 9. The sub processor 18 of the information protection unit 9 extracts the encryption key from the packet and decrypts the encryption key (Step S104).

When the reception device 1 further receives the encrypted CAS program, the main processor 8 passes the encrypted CAS program to the information protection unit 9. The sub processor 18 of the information protection unit 9 determines whether the validity of the received CAS program can be proved, on the basis of the information proving the validity of the entire CAS program contained in the additional information of the CAS program (Step S105). When the validity of the received CAS program is not proved (No in Step S105), the sub processor 18 terminates the CAS program update process.

On the other hand, when the validity of the received CAS program is proved (Yes in Step S105), the sub processor 18 determines whether the maker ID and the platform ID contained in the additional information respectively match the maker ID and the platform ID registered in advance (Step S106). When at least one of the maker ID and the platform ID does not match the corresponding ID (No in Step S106), the sub processor 18 terminates the CAS program update process.

On the other hand, when both the maker ID and the platform ID match the respective IDs (Yes in Step S106), the sub processor 18 determines whether update of the CAS program is needed, on the basis of the CAS or DRM scheme name contained in the additional information and the version numbers related to the name (Step S107). When update of the CAS program is not needed (No in Step S107), the sub processor 18 terminates the CAS program update process.

When update of the CAS program is needed, conversely (Yes in Step S107), the sub processor 18 decrypts program modules each having at least one of the major version number and the minor version number indicated in the additional information larger than the corresponding version number registered in advance, among the individual program modules. The sub processor 18 then updates corresponding program modules with the decrypted program modules (Step S108). When the scheme name contained in the additional information indicates that the CAS program is new or the version of the entire CAS program has been upgraded, the sub processor 18 may decrypt all the program modules. The sub processor 18 registers the updated program modules, the version numbers of the CAS program, and the like (Step S109). The reception device 1 then terminates the CAS program update process.

As described above, in this receiver device, the main processor determines whether the device itself is the CAS program update target, on the basis of the notification signal, and the information protection unit decrypts, updates, and registers the CAS program. With this configuration, the reception device can reduce the risk of information leakage at the time of update or registration of the CAS program while reducing the processing load on the information protection unit.

According to a modified example, the processes performed by the information protection unit 9 may be implemented by a program that runs on the main processor 8. In the following description, a program executing processes to be performed at the information protection unit 9 is referred to as a CAS base program for the sake of convenience. For example, in accordance with an operation system operating on the main processor 8, the CAS base program also operates, by time sharing, together with a plurality of other programs operating on the main processor 8. The other programs operating on the main processor 8 may be programs the validity of which is not proved, in some cases. To avoid hacking into the CAS base program by the other programs operating on the main processor 8, the program code of the CAS base program is preferably obfuscated.

Obfuscation is to make the program code complex to consequently make program analysis, which is a major premise of hacking, complex, without changing the result obtained through operations being performed.

In the state where the reception device 1 is turned off, the CAS base program is stored in the nonvolatile memory circuit 7 in an encrypted state.

A program for starting the CAS base program and a program for updating the CAS base program may be stored in the nonvolatile memory circuit 7. To make hacking difficult, an obfuscation process is preferably applied on the programs.

Next, a CAS base program operation procedure is described. When the reception device 1 is turned on, the main processor 8 reads the start program stored in the nonvolatile memory circuit 7 and causes the start program to operate. The main processor 8 decrypts the encrypted CAS base program with an obfuscated decryption key contained in the start program, and writes the decrypted CAS base program in the volatile memory circuit 6. The obfuscation of the decryption key is, for example, performed by embedding information items for obtaining the decryption key into a plurality of parts of the program code of the start program and performing a prescribed operation on the information items to obtain the decryption key. The decrypted CAS base program performs similar operations as those of the units of the information protection unit 9.

The main processor 8 starts the update program in accordance with the start program. The main processor 8 regularly checks update of the CAS base program by broadcast or via a communication network in accordance with the update program. When it is possible to receive an updated version of the CAS base program, the main processor 8 receives the CAS base program and updates the CAS base program. With this configuration, the reception device 1 can reduce the possibility that the CAS base program is analyzed or hacked.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A reception device comprising:

a memory which stores, for each of at least one function handling confidential information, a stored program module implementing a corresponding function, and first and second stored version numbers of the stored program module;

a receiver configured to receive a conditional access system program being encrypted and used to execute a process related to the confidential information, and a notification signal notifying of delivery of the conditional access system program and including delivery destination information identifying a delivery destination of the conditional access system program which includes, for each received program module in the conditional access system program, first and second received version numbers of the received program module;

a processor configured to determine whether the reception device is a delivery target of the conditional access system program on the basis of the delivery destination information included in the notification signal, and prepare for receiving the conditional access system program when the reception device is the delivery target of the conditional access system program; and an information protection circuit configured to determine whether the reception device is a use target of the conditional access system program with reference to the identification information included in the conditional access system program, and decrypt the conditional access system program when the reception device is the use target of the conditional access system program, including when either of the first and second received version numbers of the received program module in the conditional access system program is larger than the first and second stored version numbers, respectively, of the stored program module corresponding thereto, decrypt the received program module to obtain a decrypted program module, delete the stored program module in the memory corresponding to the received program module in the conditional access system program only when the second received version number of the received program module is larger than the second stored version number of the stored program module in the memory corresponding thereto; and store the decrypted program module in the memory.

2. The reception device according to claim 1, wherein the information protection circuit encrypts the conditional access system program with a unique key not accessible from outside the information protection circuit, and stores the encrypted conditional access system program in the memory.

3. The reception device according to claim 2, wherein the receiver unit receives identification information for identifying the use target of the conditional access system program and a signal for decryption including an encryption key used to encryption of the conditional access system program and encrypted with the unique key, and the information protection circuit decrypts the encryption key with the unique key when it is determined that the reception device is the use target of the conditional access system program with reference to the identification information included in the signal for decryption.

4. The reception device according to claim 1, wherein when the memory stores a plurality of first program modules with first version numbers which are different from each other, the information protection circuit outputs, to the processor, module identification information for identifying a program module to operate among the plurality of first program modules, the receiver unit receives a signal packet including the module identification information and the confidential information to be handled by the program module identified by the module identification information, and the processor passes the confidential information included in the signal packet to the information protection circuit when the module identification information included in the signal packet matches the module identification information received from the information protection circuit.

5. The reception device according to claim 1, wherein the conditional access system program includes identification information for identifying the use target of use of the conditional access system program, and the information protection circuit determines whether the reception device is the use target of the conditional access system program with reference to the identification information included in the conditional access system program, and when the reception device is the use target of the conditional access system program, decrypts the conditional access system program.

6. The reception device according to claim 1, wherein the conditional access system program includes proving information for proving validity of the conditional access system program, and the information protection circuit determines whether the validity of the conditional access system program can be proved with reference to the proving information, and when the validity of the conditional access system program can be proved, decrypts the conditional access system program.

7. The reception device according to claim 1, wherein the identification information included in the conditional access system program includes information for identifying a maker or a platform of the information protection circuit.

8. A reception method comprising:

storing in a memory, for each of at least one function handling confidential information, a stored program module implementing a corresponding function, and first and second stored version numbers of the stored program module stored in the memory;

receiving a conditional access system program being encrypted and used to execute a process related to confidential information, and a notification signal for notifying of delivery of the conditional access system program and including delivery destination information for identifying a delivery destination of the conditional access system program which includes, for each received program module in the conditional access system program, first and second received version numbers of the received program module;

determining, by a processor, whether the reception device is a delivery target of the conditional access system program on the basis of the delivery destination information included in the notification signal;

preparing, by the processor, to receive the conditional access system program when the reception device is the delivery target of the conditional access system program;

decrypting the conditional access system program by an information protection circuit which executes the process relating to the confidential information, including when either of the first and second received version numbers of the received program module in the conditional access system program is larger than the first and second stored version numbers, respectively, of the stored program module corresponding thereto, decrypting the received program module to obtain a decrypted program module;

deleting, by the information protection circuit, the stored program module in the memory corresponding to the received program module in the conditional access system program only when the second received version number of the received program module is larger than the second stored version number of the stored program module in the memory corresponding thereto; and storing the decrypted program module in the memory by the information protection circuit.

* * * * *